US012665832B2

(12) United States Patent     (10) Patent No.:   US 12,665,832 B2

Gelman et al.        (45) Date of Patent:    Jun. 23, 2026

(54) SPECTRAL DEFRAGMENTATION IN COMMUNICATION NETWORKS

(71) Applicant: ECI Telecom Ltd., Petah Tikva (IL)

(72) Inventors: Efraim Gelman, Ramat Gan (IL); Inbal Hecht, Petah Tikva (IL); Shirel Ezra, Ganei Tal (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 19/013,833

(22) Filed: Jan. 8, 2025

(65) Prior Publication Data

US 2025/0227051 A1     Jul. 10, 2025

Related U.S. Application Data

(63) Continuation of application No. 18/434,477, filed on Feb. 6, 2024, now Pat. No. 12,206,571, which is a continuation of application No. 18/364,137, filed on Aug. 2, 2023, now Pat. No. 11,929,909.

(60) Provisional application No. 63/495,708, filed on Apr. 12, 2023.

(51) Int. Cl.
    *H04L 45/02*      (2022.01)
    *H04L 45/12*      (2022.01)

(52) U.S. Cl.
    CPC ............ *H04L 45/02* (2013.01); *H04L 45/123* (2013.01); *H04L 45/124* (2013.01)

(58) Field of Classification Search
    CPC ...... H04L 45/02; H04L 45/123; H04L 45/124
    USPC ....................................... 709/238
    See application file for complete search history.

(56) References Cited

U.S. PATENT DOCUMENTS

| | | | | |
|---|---|---|---|---|
| 6,175,870 B1 * | 1/2001 | Gawlick | ............ | H04Q 11/0478 |
| | | | | 709/227 |
| 6,643,699 B1 * | 11/2003 | Liver | ...................... | H04L 45/14 |
| | | | | 709/227 |
| 10,554,538 B2 * | 2/2020 | Spohn | ................... | H04L 45/125 |
| 11,025,533 B1 * | 6/2021 | Ezra | ...................... | H04L 45/123 |

(Continued)

FOREIGN PATENT DOCUMENTS

| | | | | | |
|---|---|---|---|---|---|
| CN | 109257287 A | * | 1/2019 | ......... | H04L 43/0829 |
| JP | 2025537847 A | * | 11/2025 | ............. | H04L 45/02 |

OTHER PUBLICATIONS

Extended European Search Report in counterpart European Patent Application No. 24170107.7 mailed Sep. 17, 2024, 9 pages.

*Primary Examiner* — Anthony Mejia

(74) *Attorney, Agent, or Firm* — Finnegan, Henderson, Farabow, Garrett & Dunner, LLP

(57)       ABSTRACT

An assignment of demands to routes on a communication network can be improved by selecting and updating a subset of the routes. A network management system (or other communication network component) can obtain a representation of the communication network. The representation can include a network graph, sets of resources, and a set of paths for the network graph. The network management system can update the set of paths by selecting a path subset and updating the paths of the path subset. The updating can satisfy a total change condition and a network improvement condition. The updating can be limited to unused edge and resource combinations or edge and resource combinations used by paths in the path subset. The network management system can configure the communications network to satisfy the demand using routes corresponding to the updated set of paths.

20 Claims, 8 Drawing Sheets

(56) References Cited

U.S. PATENT DOCUMENTS

| | | | |
|---|---|---|---|
| 11,432,166 B2 * | 8/2022 | Frank | H04W 24/02 |
| 11,611,485 B1 * | 3/2023 | Gelman | H04L 45/124 |
| 11,929,909 B1 | 3/2024 | Gelman et al. | |
| 2009/0022056 A1 * | 1/2009 | Ninan | H04L 45/70 |
| | | | 370/238 |
| 2009/0296719 A1 * | 12/2009 | Maier | H04L 47/29 |
| | | | 370/400 |
| 2013/0070617 A1 * | 3/2013 | Clow | H04L 45/12 |
| | | | 370/252 |
| 2016/0191194 A1 * | 6/2016 | Wood | H04L 41/0896 |
| | | | 398/58 |
| 2017/0222912 A1 * | 8/2017 | Atkinson | H04L 45/12 |
| 2018/0144279 A1 * | 5/2018 | Yao | G06Q 10/06313 |
| 2020/0296001 A1 * | 9/2020 | She | H04L 12/4625 |
| 2021/0119910 A1 * | 4/2021 | Chen | H04Q 11/00 |
| 2022/0210072 A1 * | 6/2022 | Dutta | H04L 47/125 |
| 2024/0348526 A1 | 10/2024 | Gelman et al. | |

* cited by examiner

Unassigned Frequency Spectrum 301

Contiguous Frequency Slots 305

Available Spectrum 310

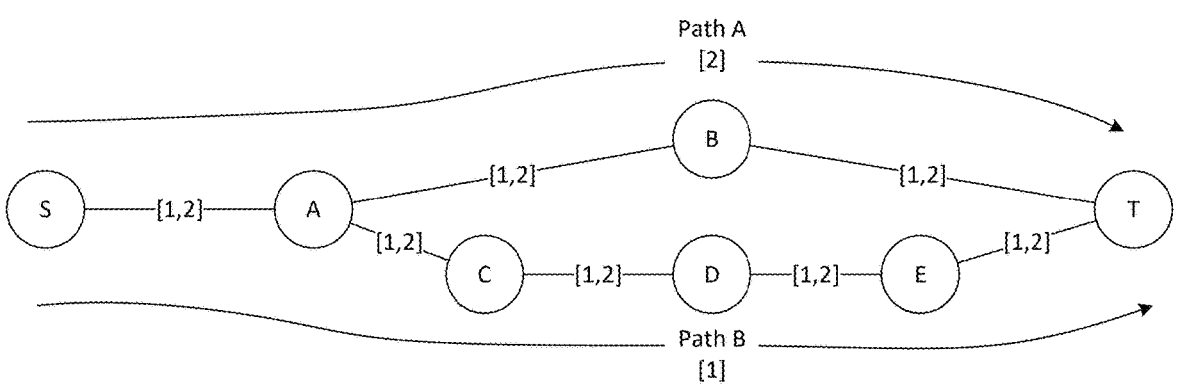
FIG. 4A
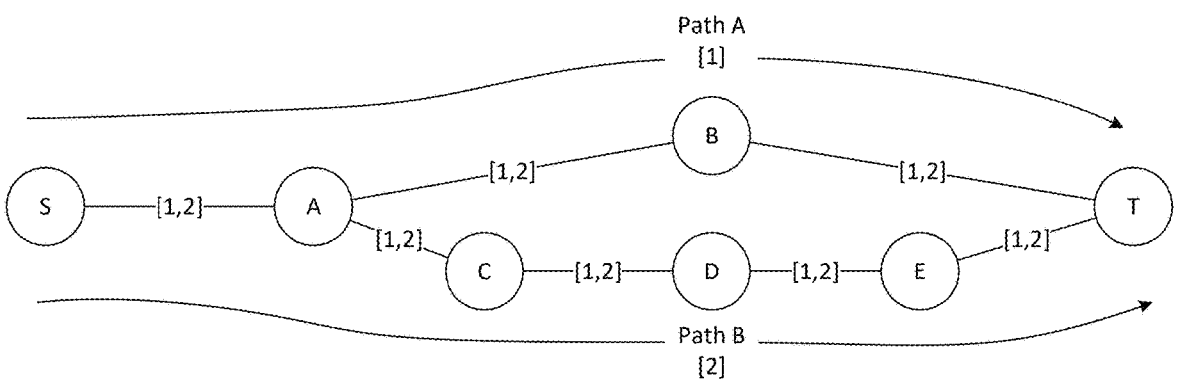
FIG. 4B
FIG. 4C

| Network | Original Cost | 10 | 20 | 30 | 40 | 50 | 60 | 70 | 80 | 90 | 100 |
|---------|---------------|-----|-----|-----|-----|-----|-----|-----|-----|-----|-----|
| Operator A | 864 | 79% | 71% | 59% | 41% | 40% | 37% | 21% | 16% | 7% | 0% |
| Operator B | 160 | 80% | 55% | 50% | 45% | 30% | 20% | 5% | 5% | 5% | 0% |
| Operator C | 336 | 82% | 67% | 57% | 50% | 25% | 28% | 17% | 10% | 7% | 0% |

% Change Allowed

FIG. 5

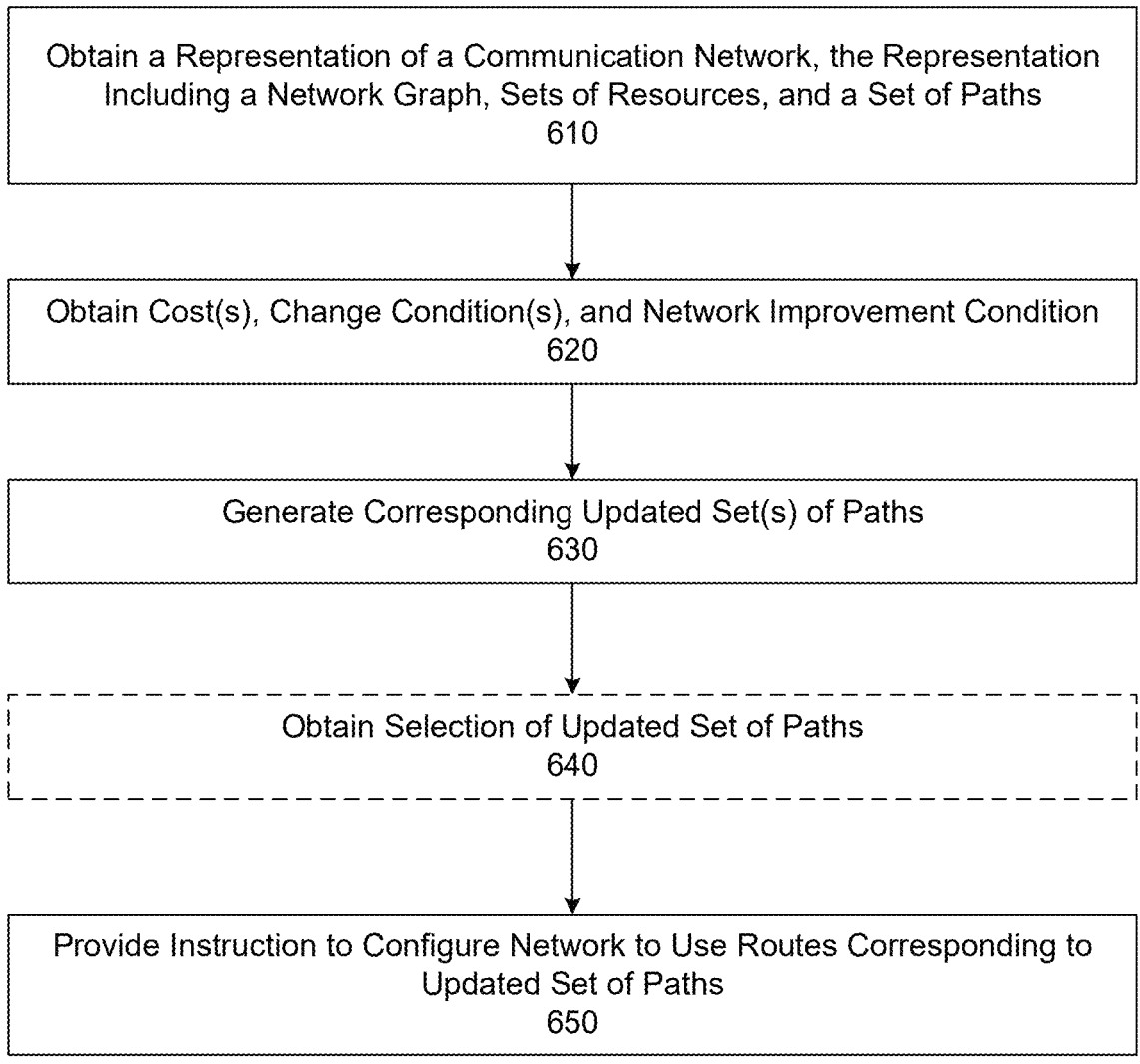

600

Obtain a Representation of a Communication Network, the Representation
Including a Network Graph, Sets of Resources, and a Set of Paths
610

Obtain Cost(s), Change Condition(s), and Network Improvement Condition
620

Generate Corresponding Updated Set(s) of Paths
630

Obtain Selection of Updated Set of Paths
640

Provide Instruction to Configure Network to Use Routes Corresponding to
Updated Set of Paths
650

FIG. 6

SPECTRAL DEFRAGMENTATION IN COMMUNICATION NETWORKS

CROSS-REFERENCE TO RELATED APPLICATION

This application is a continuation of U.S. application Ser. No. 18/434,477, filed Feb. 6, 2024, which is a continuation of U.S. application Ser. No. 18/364,137, filed Aug. 2, 2023, which claims the benefit of U.S. Provisional App. No. 63/495,708, filed on Apr. 12, 2023. Each patent application identified above is incorporated herein by reference in its entirety.

TECHNICAL FIELD

The present disclosure relates to the field of communication networks and, more particularly, to systems and methods for routing in communication networks.

BACKGROUND

An optical communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network. Determining routes on a communications network that satisfy a set of demands is an NP-hard problem. Because this problem is NP-hard, determining an optimal assignment of demands to routes, for some optimality criterion, becomes intractable as the size of the optical communication network or number of demands increases.

SUMMARY

Systems and methods are disclosed for improving the assignment of demands to routes for a communication network. A representation of the communication network can be obtained. the representation can include a network graph, sets of resources, and a set of paths corresponding to the routes. Cost(s) for changing the configuration of the communication network, cost condition(s), and a network improvement condition can be obtained. A subset can be selected and updated paths can be determined. The updated paths can satisfy the cost condition(s), given the cost(s), while satisfying the network improvement condition.

The disclosed embodiments include a network management method. The network management method can include operations. The operations can include obtaining a representation of a communication network. The representation can include a network graph that includes vertices corresponding to nodes in the communication network and edges corresponding to communication links in the communication network. The representation can include sets of resources associated with edges in the network graph. The representation can include a set of paths for the network graph. A first path of the set of paths can correspond to a demand for the communication network, connect a source vertex corresponding to a source node of the communication network to a terminal vertex corresponding to a terminal node of the communication network, and include a set of edge and resource combinations. The operations can include updating the set of paths. Updating the set of paths can include selecting a first path subset of the set of paths and updating the paths in the first path subset. The updating can satisfy a total change condition, satisfy a network improvement condition, and be limited to unused edge and resource combinations or edge and resource combinations used by paths in the first path subset. The operations can include configuring the communications network to satisfy the demand using routes corresponding to the updated set of paths.

The disclosed embodiments include another network management method. The network management method can include operations. The operations can include obtaining a representation of a communication network. The representation can include a network graph. The network graph can include an edge $e_{12}$ that connects vertices $v_1$ and $v_2$ and an edge $e_{23}$ that connects vertices $v_2$ and $v_3$. The representation can include an ordered list of resources $r_{12i}$ associated with edge $e_{12}$, for i from 1 to 2n. The representation can include an ordered list of resources $r_{23j}$ associated with edge $e_{23}$, for j from 1 to 2n. The representation can include an ordered list of paths $p_k$ for k from 1 to 2n. The paths can correspond to demands on the communication network. For odd values of k, path $p_k$ connects $v_1$ to $v_3$ and uses resource $r_{12k}$ on edge $e_{12}$ and resource $r_{23k}$ on edge $e_{23}$. For even values of k, path $p_k$ connects $v_2$ to $v_3$ and uses resource $r_{23k}$ on edge $e_{23}$. The operations can include updating the ordered list of paths. The updating can include selecting a first path subset of the ordered list of paths including x pairs of paths, each pair including a path $p_{2n-l+1}$ and a path $p_l$ for the first x even values of l. The updating can include updating the paths in the first path subset, the updating: satisfying a total change condition that specifies a number of resource swaps x between paths in each pair of paths; reducing a Shannon entropy of the network graph; and limited to unused edge and resource combinations or edge and resource combinations used by paths in the first path subset. The updated set of paths can have a Shannon entropy of $$\left(\frac{H}{2n}\log 2n\right)+\frac{n-H}{2n}\log\frac{2n}{n-H},$$

where H is max(0, n−(2x+1)). An operation can include configuring the communications network to satisfy the demands using routes corresponding to the updated set of paths.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

FIGS. 4A to 4C depict differing sets of paths on a network graph that satisfy two demands on a corresponding communication network, consistent with disclosed embodiments.

FIG. 5 depicts utility function values for assignments of demands to routes as a function of a total change condition, consistent with disclosed embodiments.

FIG. 6 depicts an exemplary method for configuring a communications network, consistent with disclosed embodiments.

DETAILED DESCRIPTION

Figure 1:
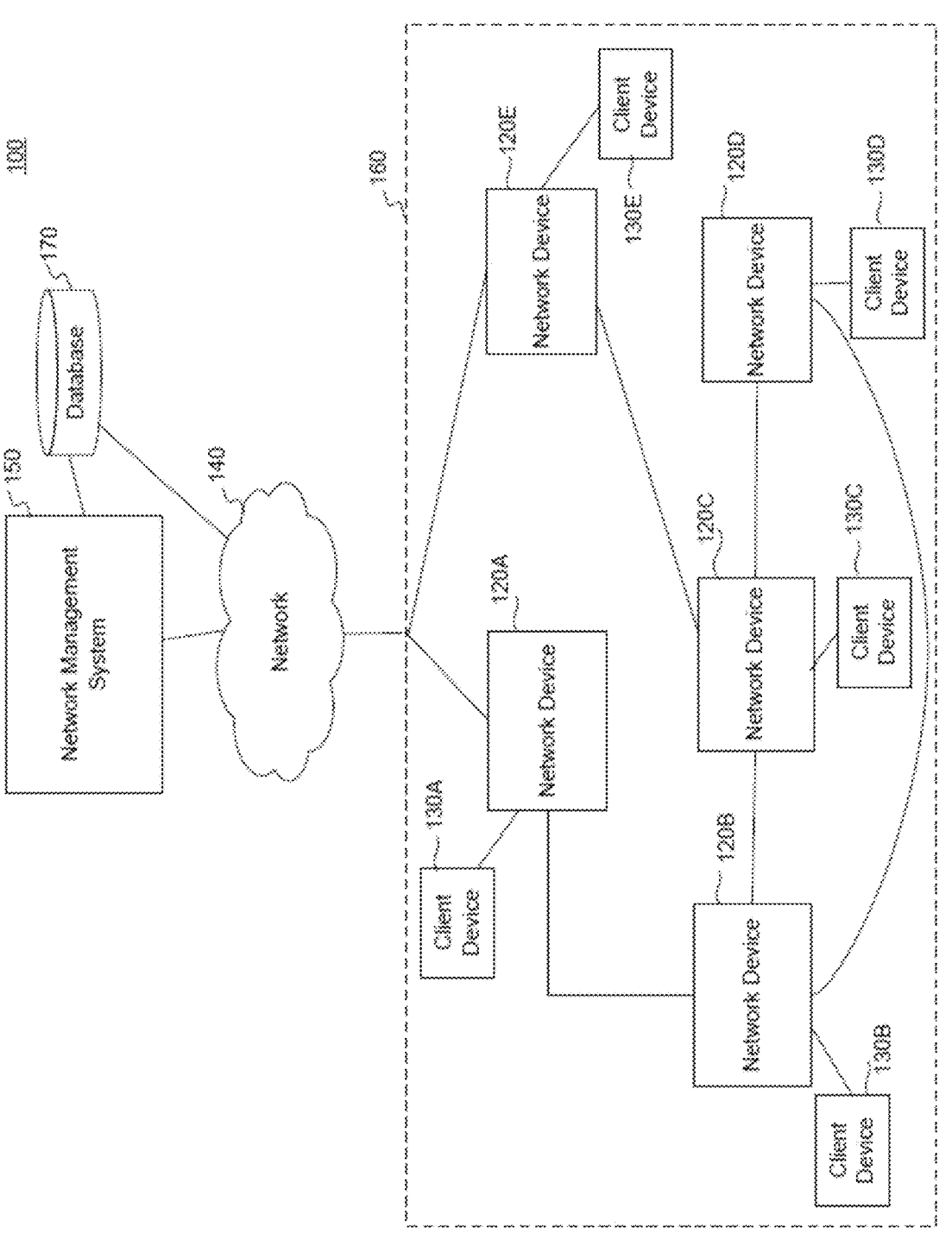
FIG. 1 depicts an exemplary data communication network in which various implementations as described herein may be practiced, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The disclosed embodiments can be performed using a graph representing the communication network. The graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Determining routes on a communications network that satisfy a set of demands is an NP-hard, technical problem. Because this problem is NP-hard, determining an optimal assignment of paths, for some optimality criterion, becomes intractable as the size of the optical communication network or number of demands increases. Multiple potential routes can exist between a source node and target node of a demand on the communication network. These routes may use different frequency slots (or differing combinations of frequency slots) and pass through different sets of intermediate nodes on the communications network. Furthermore, potential routes for different demands can conflict. For example, assigning a demand to a frequency slot on a particular communication link can prevent other demands from using that communication link. In addition, a conflict that prevents a demand from using a frequency slot on one communication link on a route can prevent the demand from using that frequency slot on all communications links on that route, as the demand may preferentially use a single frequency slot for the entire route.

Conventional routing methods may result in an inefficient assignment of demands to routes. Within communication links, an inefficient assignment may yield a greater number of smaller unused portions of the frequency spectrum (or greater number of narrower unused frequency slots). Across communication links, an inefficient assignment may yield a greater number of smaller routes of contiguous unused portions of the frequency spectrum (or unused frequency slots). Accordingly, additional demands on the communication network may be unable to identify a route from a source node to a terminal node that uses a single frequency slot. The communication network may therefore be unable to service these additional demands. In this manner, an inefficient assignment of demands to routes can reduce network capacity.

Given an original route assignment, the disclosed embodiments can generate an improved route assignment with respect to some efficiency measure. In some embodiments, the differences between the original route assignment and the improved route assignment can satisfy a total change condition. Consistent with disclosed embodiments, generation of an improved route assignment can include obtaining paths corresponding to the routes and determining replacement paths for a subset of the obtained paths. A path subset can be selected (or replacements determined) such that the total change condition is satisfied. In some embodiments, the process of determining replacement paths for subsets of the obtained paths can be repeated multiple times, and the replacement path showing the greatest improvement according to the efficiency measure can be selected. The communications network can then be configured to satisfy the demands using routes corresponding to the updated set of paths.

As may be appreciated, a more efficient assignment of demands to routes can improve the capacity of the communication network. For example, the communication network can satisfy more demands, or satisfy the same number of demands using fewer resources. Accordingly, the disclosed embodiments, by enabling more efficient assignment of demands to routes, constitute a technological improvement in network communications management.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 can be an electronic network. Nodes 120 can be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first and second signals can be non-overlapping in the frequency spectrum. In some embodiments, the WDM physical layer can be or support an elastic optical network (e.g., a "Flexgrid" network or the like). Purely for convenience of explanation, frequency slots are sometimes depicted herein as contiguous subsets of an array of unit frequency slot widths. In such depictions, the width of the frequency slot can be the number of unit frequency slot widths in the contiguous subset. The central frequency of the frequency slot can be the midpoint of the contiguous subset. Without departing from envisioned embodiments, the disclosed embodiments may be implemented using central frequencies and frequency slot widths demarcated in Hz (e.g., integer multiples of 6.25 GHz, 12.5 GHZ, or other base values; arbitrary spectrum bands defined by central frequencies and bandwidths; or other suitable schema).

Figure 2:
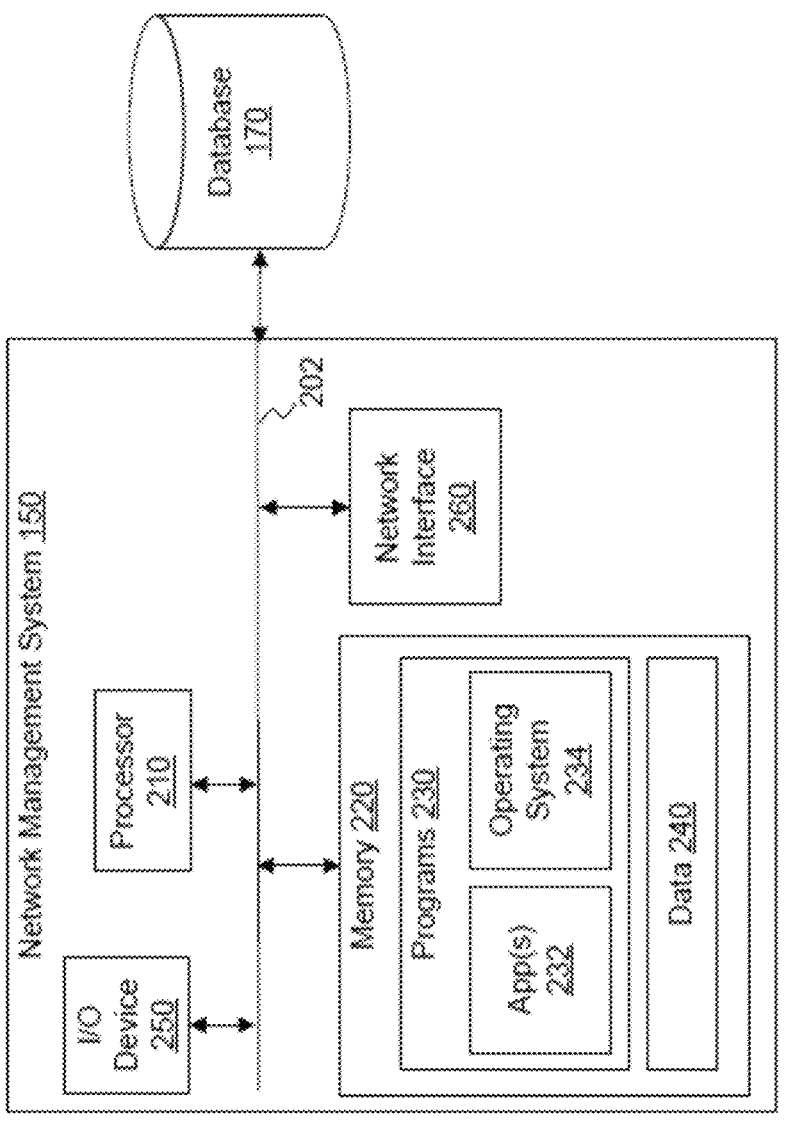
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands. The one or more of nodes 120 can be configured to satisfy one or more demands using routes on the communication network. The routes can correspond to determined paths on a network graph that corresponds to the communication network.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160.

In some embodiments, program(s) 230 may include operating system 234 performing operating system functions when executed by one or more processors such as processor 210. By way of example, operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3A:
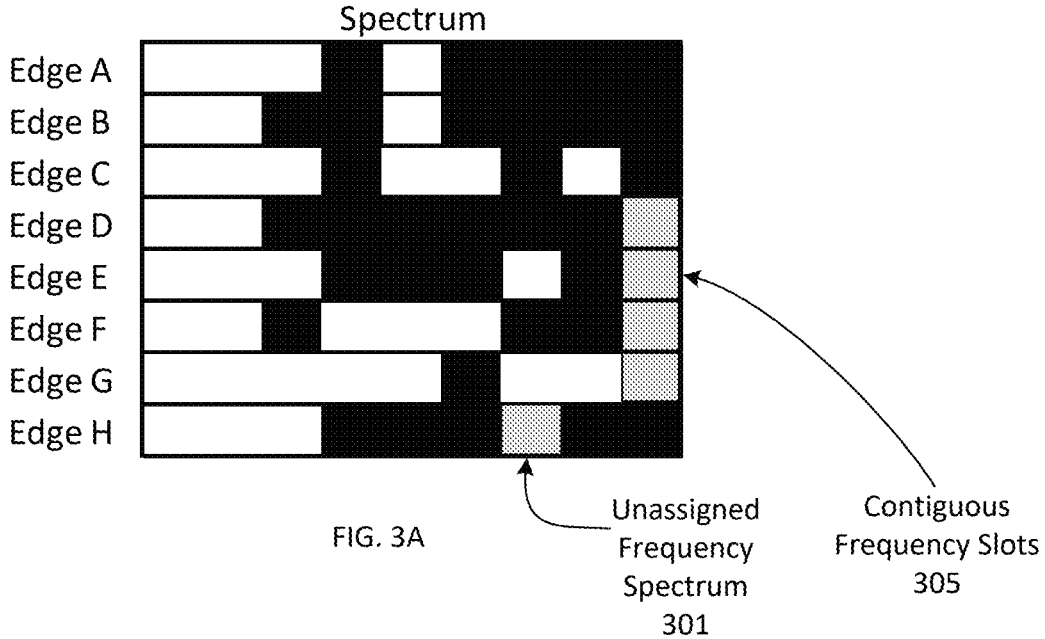
FIGS. 3A and 3B depict frequency slot assignments corresponding to two different hypothetical assignments of the same demands to routes on a communication network, consistent with disclosed embodiments.
Figure 3B:
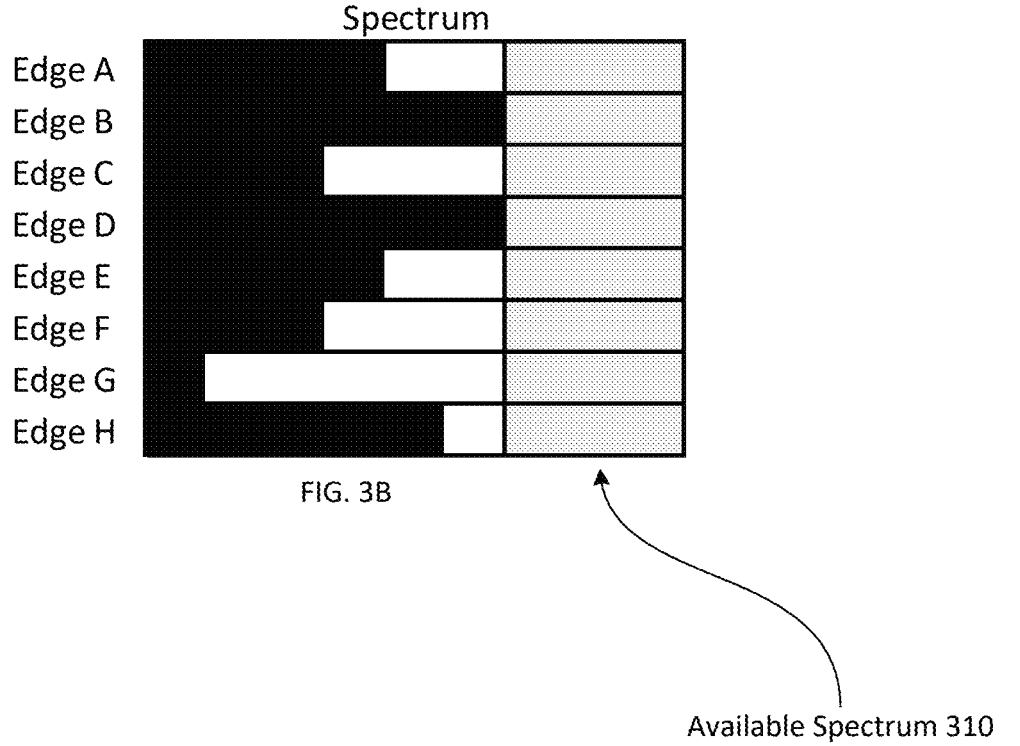

FIGS. 3A and 3B depict frequency slot assignments corresponding to two different hypothetical assignments of the same demands to routes on a communication network, consistent with disclosed embodiments. Edges A to H can be edges in a network graph that correspond to communication links in the communications network. The edges can be contiguous: edge B can be connected to edge A and edge C, edge C can be connected to edge B and edge D, etc. A horizontal frequency bar depicts the frequency spectrum for each edge. Filled subsections of the frequency bar can represent assigned portions of the frequency spectrum.

FIG. 3A depicts an inefficient frequency slot assignment. Within each edge, the unassigned portion of the frequency spectrum is divided into non-contiguous portions (e.g., unassigned frequency spectrum 301). In some embodiments, frequency slot assignments may preferentially favor lower frequencies. However, in the example depicted in FIG. 3A, higher frequency slots are used while lower frequency slots remain unused. Furthermore, across edges, few contiguous sets of high-frequency slots (e.g., contiguous frequency slots 305) are available for satisfying new demands.

FIG. 3B depicts a more-efficient frequency slot assignment. Within each edge, the unassigned portion of the frequency spectrum is united into a single contiguous portion, higher frequency slots are unused while lower frequency slots are used, and a large block of contiguous high-frequency slots is available for satisfying new demands (e.g., available spectrum 310).

The disclosed embodiments can enable a communication network to replace an inefficient frequency slot assignment, such as the assignment depicted in FIG. 3A, with a more-efficient frequency slot assignment, such as the assignment depicted in FIG. 3B. Consistent with disclosed embodiments, subsets of routes on the communication network can be identified.

FIGS. 4A to 4C depict differing three sets of paths on a network graph that satisfy two demands on a corresponding communication network, consistent with disclosed embodiments. Both paths connect source vertex S with terminal vertex T. Each edge in the network graph can support two alternative frequency slots. Each path requires one of the frequency slots. A utility function can penalize the use of combinations of edge and frequency slot. The use of a combination of an edge and frequency slot 1 is penalized, e.g., 1 unit. The use of a combination of an edge and frequency slot 2 is penalized, e.g., 0.5 units. FIG. 4A depicts an original assignment of demands to paths. FIG. 4B depicts an improved assignment, subject to a total change condition that permits changing the frequency slot used by each path. FIG. 4C depicts an improved assignment, subject to a total change condition that permits changing both the path and frequency slot used by the path. As may be seen, permitting additional flexibility in the updating of routes can result in improved solutions, according to a utility function. However, permitting more changes can increase the search space for updating the paths, thereby increasing the computational resources required to perform the updating.

FIG. 5 depicts exemplary utility function values for assignments of demands to routes as a function of a total change condition, consistent with disclosed embodiments. The relationship between utility function values and total change conditions is shown for three different network operators. The original cost value depicts the calculated value of the utility function. The subsequent columns show the calculated value of the utility function as a percentage of the original cost value. In this example, a lower calculated value is preferable. For each operator, the calculated value of the utility function decreases as more changes are permitted to the communication network. As may be appreciated, different operators can have different utility functions (e.g., Shannon's entropy, utilities dependent on frequency slot selections, utilities dependent on network edge selections, or the like).

FIG. 6 depicts an exemplary method 600 for configuring a communications network, consistent with disclosed embodiments. For convenience of disclosure, a network management system (e.g., network management system 150 of communication network 160) is described as performing method 600. However, the disclosed embodiments are not so limited. In some embodiments, method 600 can be performed by another component of a communication system (e.g., one of nodes 120, or the like), or another system.

In step 610 of method 600, the network management system 150 can obtain a representation of the communication network, consistent with disclosed embodiments. The representation of the communication network can include a network graph, a set of resources, and a set of paths. The network graph can correspond to the communication network and include edges corresponding to communication links and vertices corresponding to nodes. The set of resources can be, include, or specify frequency slots. For example, obtaining the set of resources can include obtaining a listing of transceivers for the communication links on the communication network. The listing of transceivers can specify the frequency slots (or frequency slot combinations) available on each edge of the network graph. In various embodiments, the network management system 150 can obtain the set of paths or generate the set of paths from a set of routes on the communications network.

In step 620 of method 600, the network management system 150 can obtain cost(s), change condition(s), and a network improvement condition(s), consistent with disclosed embodiments. In various embodiments, cost(s) can be associated with edges, associated with resources, or associated with combinations of edges and resources. In some embodiments, cost(s) can be associated with changes in edges, associated with changes in resources, or associated with changes in combinations of edges and resources. In some embodiments, obtaining cost(s) can include obtaining cost functions that specify costs for paths based on characteristics of the paths (e.g., edges, resources, or edge and resource combinations used by the paths). In some embodiments, the change condition(s) can specify a total change condition-a threshold cost value that cannot be exceeded. In various embodiments, the change condition(s) can specify the types of changes that can be performed (e.g., path changes, frequency slot changes, or both). In some embodiments, the network improvement condition can specify a utility function for the network. The utility function can map from the combinations of edges and resources used by the paths to a value. For example, a coloring state function $f$: E×R→{0,1} can be a mapping from the combinations of edges and resources to the binary set (e.g., whether a path on the communication network uses that combination of edges and resources). A utility function $M(f) \in \mathbb{R}$ can map from the coloring state function a real number. For convenience of description, the utility function $M(f)$ is described mapping to a benefit. Given an initial assignment of edges and resources to routes $f_{original}$, the disclosed embodiments can seek a new assignment of edges and resources to routes $f_{updated}$ that maximizes $M(f_{updated})-M(f_{new})$. However, the disclosed embodiments are not so limited. The utility function $M(f)$ can also be described as mapping to a cost. Then the disclosed embodiments can seek an $f_{updated}$ that minimizes $M(f_{updated})-M(f_{new})$.

In some embodiments, the utility function can be a Shannon entropy function of the edge and resource combinations. For example, given an edge $e \in E$ with sorted list of spectral units $[1, \ldots, C]$, the Shannon's entropy of e can be:

$$SE(e) = \sum_{l=1}^{N_F} \frac{S_l^{free}}{C} \log \frac{C}{S_l^{free}}$$

Where $N_F$ can be number of free fragments in the edge e and $$S_l^{free}$$

can be the size of free fragment 1. Then the Shannon's entropy of the network graph G can be $M(f)=S(G)=\Sigma_{e \in E} S_E(e)$.

In step 630 of method 600, the network management system 150 can generate one or more updated sets of paths, consistent with disclosed embodiments. As may be appreciated, when the network management system receives multiple cost functions, multiple change conditions, or multiple network improvement conditions, the network management system may generate multiple corresponding updated sets of paths. For example, the network management system may receive a set of total cost values in step 620. Each of these total cost values can specify a different degree of updating the paths on the communication network. The network management system may generate an updated set of paths for each of these total cost values.

Consistent with disclosed embodiments, generating an updated set of paths can include selecting a subset of the paths on the communication network and updating the paths for the subset. The disclosed embodiments are not limited to any particular method of updating the paths. In some embodiments, the network management system can redetermine the paths according to a flex grid selection method. In some embodiments, the paths in the subset are redetermined using a greedy method. The redetermined paths can satisfy the change condition(s). Furthermore, the redetermined paths can satisfy the network improvement condition. For example, when the utility function specifies a cost, the redetermined paths can have a lower cost than the original paths. As an additional example, when the utility function specifies a benefit, the redetermined paths can have a greater benefit than the original paths.

In some embodiments, the network management system can then determine restoration paths for the paths on the communication network (e.g., including both the redetermined paths and the remaining paths). Restoration paths can be determined for a path based on a protection path of the type. For example, a protection type for a demand specifies the ability to recover from any single edge (or combination of edge and resource) failure. The network management system can determine restoration paths for every potential failure of a single edge (or combination of edge and resource) on the path for the demand. In some instances, the network management system may be unable to redetermine paths for the subset (or may be unable to redetermine restoration paths for the subset). In such instances, the network management system may reselect the subset of paths, attempt updating of the paths using another cost function, change condition, or network improvement condition, or provide a suitable indication to a user or another system (e.g., a warning, error message, diagnostic report, or the like).

In optional step 640, the network management system 150 can obtain a selection of one of the updated sets of paths generated in step 630, consistent with disclosed embodiments. In some embodiments, the network management system 150 can provide indications of the updated sets of paths to a user. In response the network management system 150 can receive a selection of one of the updated sets of paths. In some embodiments, the network management system 150 can automatically select one of the updated sets of paths.

In step 650 of method 600, the network management system can provide instructions to configure the communications network to use routes corresponding to the updated set of paths to satisfy the demands on the communication network. When the network management system generates restoration paths for the paths on the network graph, the network management system can further configure the communication network to use the restoration paths in case of network failures. In some embodiments, the network management system can provide instructions to other components of the communication network (e.g., nodes 120, database 170, or the like). In some embodiments, the instructions can be received or retrieved by the node(s) of the communication network from the network management system or another component of the communication network (e.g., database 170, another node of the communication network). When processed by the components, the instructions can cause the components to (e.g., collectively) implement the routes (or appropriate restoration route) corresponding to the updated set of paths (or relevant restoration path) to satisfy the demands on the communication network.

Figure 7:
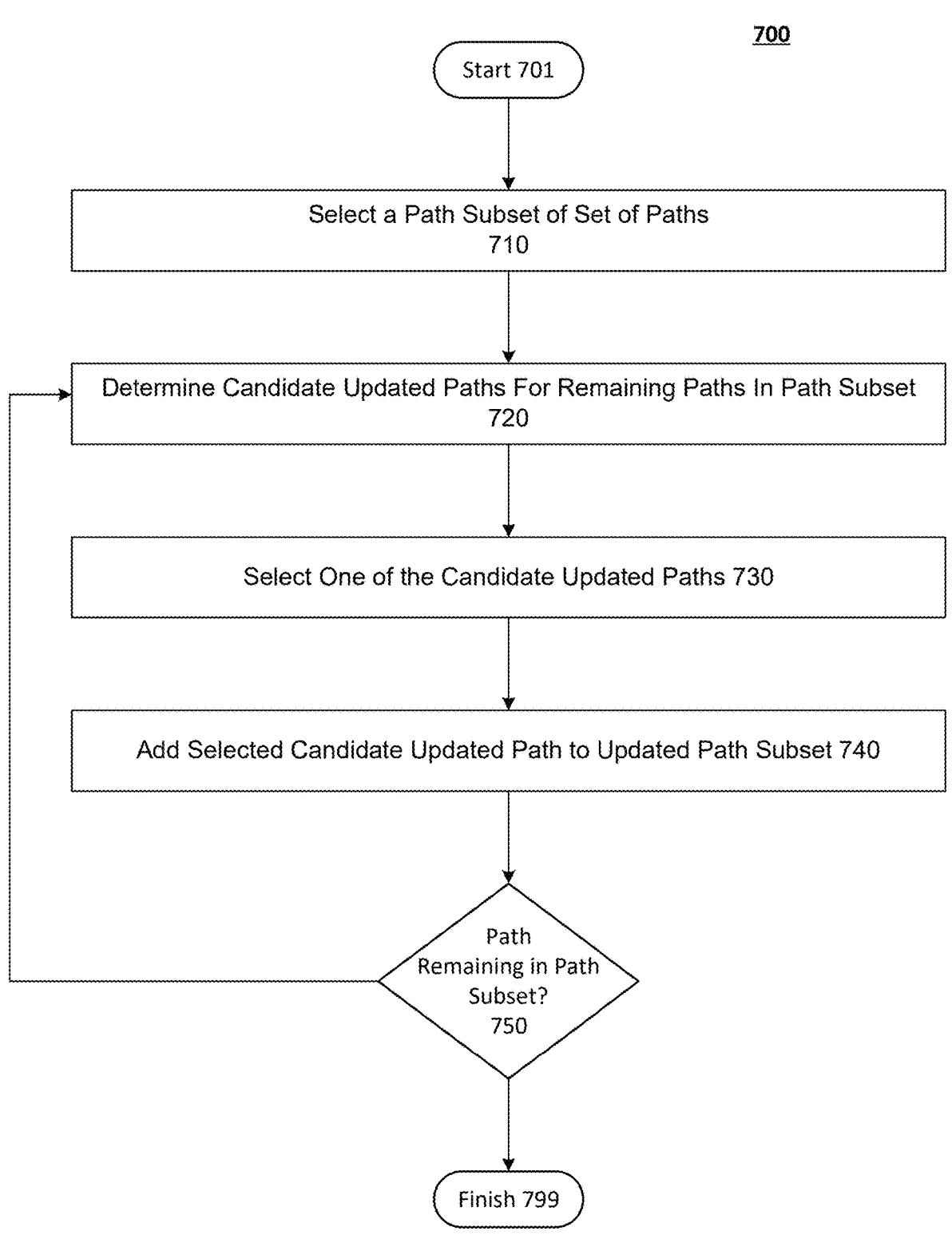
FIG. 7 depicts an exemplary process for generating an updated subset of paths, consistent with disclosed embodiments.

FIG. 7 depicts an exemplary process 700 for generating an updated subset of paths, consistent with disclosed embodiments. For convenience of explanation, a network management system (e.g., network management system 150 of communication network 160) is described as performing process 700. However, the disclosed embodiments are not so limited. In some embodiments, process 700 can be performed by another component of a communication system (e.g., one of nodes 120, or the like), or another system.

In step 701, process 700 can begin. In some embodiments, process 700 can be performed as part of another process, such as process 600. In such embodiments, process 700 can use the network representation, set of resources, and set of paths obtained in step 610 of process 600. Process 700 can also use a combination of cost(s), change condition(s), and network improvement conditions obtained in step 610 of process 600. In some embodiments, process 700 can be performed multiple times, using different combinations of cost(s), change condition(s), and network improvement conditions to generate different updated sets of paths. For example, a set of different total cost values can be obtained in step 620. In step 630 of process 600, process 700 can be performed multiple times using the different total cost values. The resulting updated sets of paths can be automatically, manually, or semi-manually selected among in optional step 640 of process 600. In various embodiments, process 700 can be performed independently of process 600. In such embodiments, a combination of cost(s), change condition(s), and network improvement conditions can be obtained at step 701 (e.g., in the manner described in step 610).

In step 710 of process 700, the network management system can select a path subset of the set of paths for updating, consistent with disclosed embodiments. In some embodiments, the network management system can select the paths based on a cost associated with the paths or with the demands associated with the paths. A selected path can be included in the path subset when the resulting total cost of the path subset is less than a threshold value. In some embodiments, the network management system can be configured to select at most a predetermined number of paths to include in the subset (e.g., the threshold value is the number of paths included in the path subset when each path has a unit cost).

In some embodiments, the network management system can select the path subset randomly. In some embodiments, the network management system can select the path subset according to a utility function (e.g., $M(f)$ as described herein, or another suitable utility function). In such embodiments, the network management system can iteratively add the least valuable or beneficial (or most expensive) of the unselected paths to the path subset, according to the utility function $M(f)$. Given the paths on the network p and a current path subset $p_s$, the network management system can determine the complement of the paths in the current path subset $p \backslash p_s$ (e.g., a first complementary subset). The network management system can apply the edge and resource combinations used in paths in the first complementary subset (e.g., $f_{p \backslash p_s}$) to the utility function to yield a utility value (e.g., a first utility value $M(f_{p \backslash p_s})$). The network management system can select a path in the first complementary subset (e.g., $p_i \in p \backslash p_s$). The network management system can determine the complement of the paths in the current path subset and the selected path $p \backslash \{p_i, p_s\}$ (e.g., a second complementary subset). The network management system can apply the edge and resource combinations used in paths in the second complementary subset (e.g., $f_{p \backslash \{p_i, p_s\}}$) to the utility function to yield a utility value (e.g., a first utility value $M(f_{p \backslash \{p_i, p_s\}})$). Based on the difference between the first utility value and the second utility value, the network management system can determine whether to include $p_i$ in $p_s$. For example, the network management system can select $p_i$ such that:

$$p_i = \operatorname*{argmin}_{p_i} \bigl( M\bigl(f_{p \backslash p_s}\bigr) - M\bigl(f_{p \backslash \{p_i, p_s\}}\bigr) \bigr) p_i \in p \backslash p_s$$

In each iteration, the network management system can therefore include in the path subset the paths that contributes least to the utility of the remaining, unselected paths.

In step 720 of process 700, the network management system 150 can determine candidate updated paths, consistent with disclosed embodiments. Each path in path subset can connect a source vertex to a terminal vertex. The network management system can determine a new path connecting the source vertex to the terminal vertex.

In some embodiments, when updating the paths, the network management system can be configured to consider only a subset of the edge and resource combinations on the communication network. This edge and resource subset can include the edge and resource combinations used by the paths in the subset of paths. The resource subset can further include unused edge and resource combinations on the communication network. In such embodiments, the network management system may not consider edge and resource combinations used by paths not included in the selected subset of paths.

In some embodiments, the candidate paths can satisfy change condition(s). As described herein, such change conditions can limit differences between the original path and the corresponding, updated path. For example, the updated path can be limited to using the same resources as the original path (e.g., the same frequency slots, transceivers, or the like), but not the same edges. As an additional example, the updated path can be limited to using the same edges as the original path, but not the same resources. As an additional example, when the change condition(s) specify a threshold cost value, the network management system can ensure that the inclusion of a candidate path in the redetermined paths does not cause the set of redetermined paths to exceed the threshold cost value. For example, the network management system can apply the candidate path and the set of updated paths to a cost function. The cost function can depend on the edges, resources, or combinations of edges and resources included in the candidate path and the set of updated paths. For example, where $p_r$ is the set of updated paths, $p_i$ is the candidate path, and C is total cost value:

$$C = \sum_{p_j \in \{p_r, p_i\}} c(f(p_j))$$

The network management system can ensure that $C \leq K$, where K is the threshold cost value. As may be appreciated, in some embodiments the network management system may not include a candidate path in the set of updated paths if the candidate path would cause a total cost value of the set of updated paths to exceed the threshold cost value.

In some embodiments, the network management system can determine scores for edges on the network graph (or combinations of edges and resources) and determine candidate paths based on the scores. For example, the network management system can determine scores and/or find paths as described in U.S. application Ser. Nos. 18/329,370, 18/324,848, or 18/353,749. In some embodiments, the network management system can determine paths as described in in U.S. application Ser. Nos. 18/356,054 or 17/685,874. As may be appreciated, the disclosed embodiments are not limited to such methods. Other suitable path finding methods can be used without departing from the envisioned embodiments.

In step 730 of process 700, the network management system 150 can select one of the candidate paths, consistent with disclosed embodiments. In some embodiments, the network management system can select the candidate path using a greedy method. In some embodiments, the candidate path can be selected based on a change in utility values (e.g., between the original path for the demand and the updated path for the demand, or the like). For example, the network management system can be configured to determine a utility function value for each candidate path. For example, when the existing set of updated paths is $p_r$ and the candidate path is $p_i$, then the network management system can determine a value $M(f_{\{p_i, p_r\}})$ for the candidate path (or $M(f_{p_i})$, or another suitable value). The network management system can select among the candidate paths based on the utility function value (e.g., $$p_i = \operatorname*{argmax}_{p_i} M\bigl(f_{\{p_i, p_r\}}\bigr),$$

or the like). In some embodiments, the candidate path can be selected based on a variance in utility values. In some embodiments, the network management system can use different utility functions for selecting the path subset and for selecting among candidate paths. In some embodiments, the network management system can use the same utility function to select the path subset and to select among the candidate paths.

In step 740 of process 700, the network management system 150 can add the selected candidate updated path to the set of updated paths, consistent with disclosed embodiments. The corresponding original path can be removed from the path subset.

In step 750 of process 700, the network management system 150 can determine whether any original paths remain in the path subset, consistent with disclosed embodiments. If original paths remain in the path subset, process 700 can return to step 720. In some embodiments, the network management system 150 can determine whether the addition of the selected candidate updated path to the updated path set renders any other candidate paths invalid. Such invalid candidate paths can be removed from the set of candidate paths. Updated candidate paths can be re-determined for any remaining paths in the path subset that lack corresponding candidate paths in the updated set of candidate paths. In some embodiments, the network management system 150 can re-determine candidate paths corresponding to all remaining original paths in the path subset, without regard to whether these original paths lack corresponding candidate paths in the updated set of candidate paths. If no original paths remain in the path subset, process 700 can proceed to step 799.

In step 799, process 700 can finish. In some embodiments, when process 700 is performed as part of another process (e.g., process 600), the updated set of paths can be used in subsequent steps of that process. In embodiments in which process 700 is performed independently, the updated set of paths can be provided to a user, another component of the communication system (e.g., database 170, nodes 120, or the like), or another system; or the communication network can be configured to satisfy demands on the communication network using routes corresponding to the updated set of paths (and the other, unchanged paths).

Figure 8A:
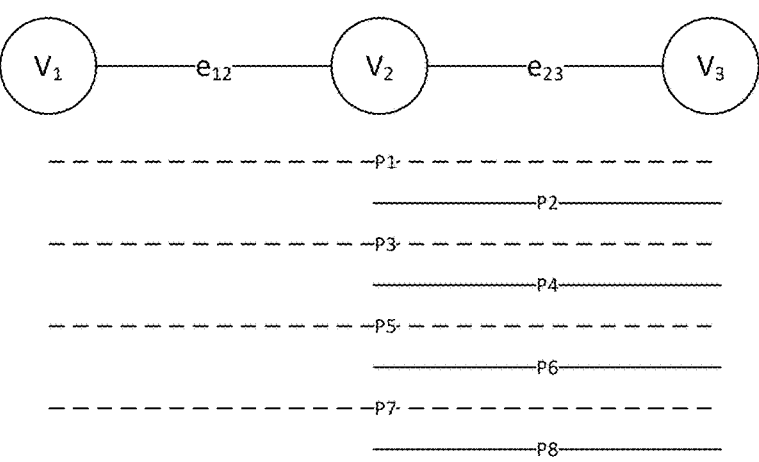
FIGS. 8A to 8C depict updating a communication network having a particular structure, consistent with disclosed embodiments.
Figure 8B:
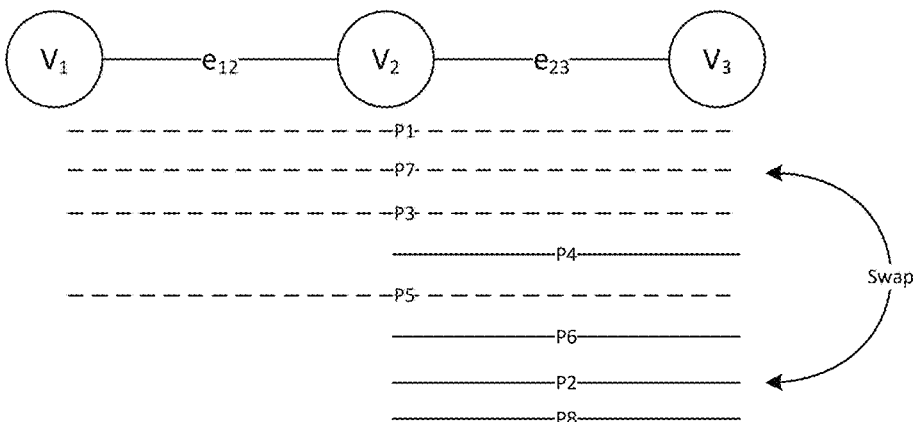
Figure 8C:
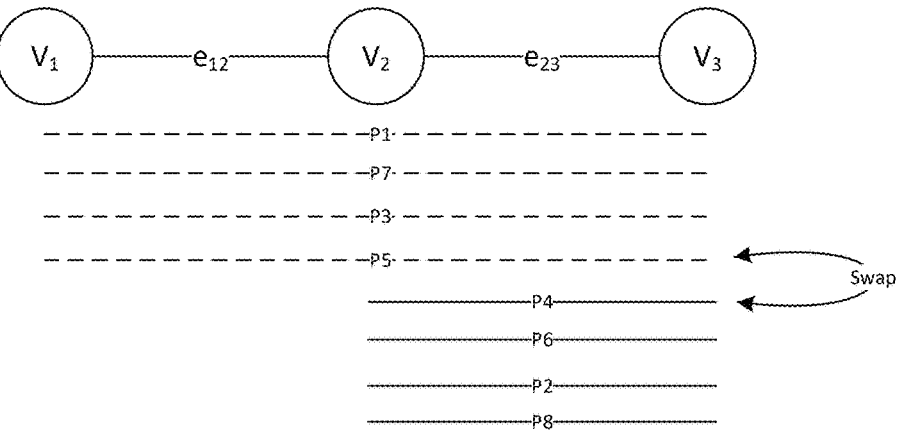

FIGS. 8A to 8C depict updating a network graph corresponding to a communication network having a particular structure, consistent with disclosed embodiments. For convenience of explanation, network management system 150 is described as updating communication network (e.g., network management system 150 of communication system 100). However, the disclosed embodiments are not so limited. In some embodiments, the updating can be performed by another component of a communication system (e.g., one of nodes 120, or the like), or another system.

The network graph can include an edge $e_{12}$ that connects vertices $v_1$ and $v_2$; and edge $e_{23}$ that connects vertices $v_2$ and $v_3$. An ordered list of resources $r_{12i}$ can be associated with edge $e_{12}$, for i from 1 to 2n (e.g., $r_{121}, r_{122}, \ldots, r_{12(2n)}$). An ordered list of resources $r_{23j}$ can be associated with edge $e_{23}$, for j from 1 to 2n. An ordered list of paths $p_k$ for k from 1 to 2n can be associated with the communication network. The paths can correspond to demands on the communication network. In this example, for odd values of k, path $p_k$ can connect $v_1$ to $v_3$ and use resource $r_{12k}$ on edge $e_{12}$ and resource $r_{23k}$ on edge $e_{23}$. For even values of k, path $p_k$ can connect $v_2$ to $v_3$ and use resource $r_{23k}$ on edge $e_{23}$.

The network management system can be configured to receive the network graph and the ordered lists of resources. The network management system can be configured to update the ordered list of paths, consistent with disclosed embodiments.

Consistent with disclosed embodiments, the network management system can select a first path subset of the ordered list of paths including x pairs of paths, each pair including a path $p_{2n-l+1}$ and a path $p_l$ for the first x even values of l. The network management system can update the paths in the first path subset. The updating can satisfy a total change condition that specifies a number of resource swaps x between paths in each pair of paths. The updating can reduce a Shannon entropy of the network graph. In performing the updating, the network management system can be limited to considering unused edge and resource combinations or edge and resource combinations used by paths in the first path subset. The network management system can be configured with a utility function, the utility function being the Shannon entropy function. The network management function can further be configured with a cost function that assigns a unit cost to any change of an existing path.

In a first iteration, when n is 4, the Shannon entropy of edge $e_{12}$ is $$SE(e_{12}) = \sum_{f=1}^{n} \frac{1}{2n}\log 2n = \frac{1}{2}\log 2n,$$

while the Shannon entropy of edge $e_{23}$ is $SE(e_{23})=0$. Thus, the initial utility function value is $$M(f_{original}) = SE(e_{12}) + SE(e_{23}) = \frac{1}{2}\log 2n = 1.04.$$

The network management system can determine that switching paths $p_{8-2+1}$ and a path $p_2$ maximally reduces the value of M(f).

In a second iteration, the Shannon entropy of edge $e_{12}$ is $$SE(e_{12}) = \frac{1}{8}\log 8 + \frac{3}{8}\log \frac{8}{3},$$

while the Shannon entropy of edge $e_{23}$ is $SE(e_{23})=0$. Thus, the updated utility function is $$M(f_{first\ iteration}) = SE(e_{12}) + SE(e_{23}) = \frac{1}{8}\log 8 + \frac{3}{8}\log \frac{8}{3} = 0.628.$$

The network management system can determine that switching paths $p_{8-4+1}$ and a path $p_4$ maximally reduced the value of M(f).

The resulting Shannon entropy of edge $e_{12}$ is $$SE(e_{12}) = \frac{4}{8}\log \frac{8}{4},$$

while the Shannon entropy of edge $e_{23}$ is $SE(e_{23})=0$. Thus, the final utility function is $$M(f_{final}) = SE(e_{12}) + SE(e_{23}) = \frac{4}{8}\log \frac{8}{4} = 0.346.$$

In general, for networks having this configuration, the updated set of paths can have a Shannon entropy of $$\left(\frac{H}{2n}\log 2n\right) + \frac{n-H}{2n}\log \frac{2n}{n-H},$$

where H is max(0, n−(2x+1)).

As may be appreciated, the network management system can be configured to provide instructions to the communication network to satisfy the demands on the network using routes corresponding to the updated set of paths.

The disclosed embodiments may further be described using the following clauses:

1. A network management system, comprising: at least one processor; and a computer-readable medium containing instructions that, when executed by the at least one processor, cause the network management system to perform operations comprising: obtaining a representation of a communication network, the representation including: a network graph that includes vertices corresponding to nodes in the communication network and edges corresponding to communication links in the communication network; sets of resources associated with edges in the network graph; and a set of paths for the network graph, a first path of the set of paths: corresponding to a demand for the communication network; connecting a source vertex corresponding to a source node of the communication network to a terminal vertex corresponding to a terminal node of the communication network; and including a set of edge and resource combinations; updating the set of paths, the updating comprising: selecting a first path subset of the set of paths; updating the paths in the first path subset, the updating: satisfying a total change condition; satisfying a network improvement condition; and limited to unused edge and resource combinations or edge and resource combinations used by paths in the first path subset; and configuring the communication network to satisfy the demand using routes corresponding to the updated set of paths.

2. The network management system of clause 1, wherein: the first path subset is randomly selected; or the first path subset is selected according to a utility function that maps from edge and resource combinations to utility values.

3. The network management system of any one of clauses 1 to 2, wherein: the first path subset is selected according to a utility function that maps from edge and resource combinations to utility values; and the utility function comprises a Shannon entropy function of the edge and resource combinations.

4. The network management system of any one of clauses 1 to 3, wherein: selecting the first path subset comprises: determining a first complementary subset in the set of paths, the first complementary subset being a complement of the first path subset; applying the edge and resource combinations included in the paths of the first complementary subset to a first utility function to generate a first utility value; selecting a candidate path in the first complementary subset; determining a second complementary subset in the set of paths, the second complementary subset being a complement of the candidate path and first path subset; applying edge and resource combinations included in the paths of the second complementary subset to the first utility function to generate a second utility value; and including the candidate path in the first path subset based in part on the first utility value and the second utility value.

5. The network management system of any one of clauses 1 to 4, wherein: selecting the candidate path in the set of paths comprises: applying the candidate path and the first path subset to a first cost function to generate a first cost value; and including the candidate path in the first path subset based in part on the first cost value and a total cost value.

6. The network management system of any one of clauses 1 to 5, wherein: the paths in the first path subset are updated according to a flex grid selection method; or the paths in the first path subset are iteratively updated using a greedy method based on: a change in a utility value associated with the updated paths; or a variance in utility values associated with the updated paths.

7. The network management system of any one of clauses 1 to 6, wherein: satisfaction of the total change condition depends on costs associated with each updated path.

8. The network management system of clause 7, wherein: a first cost associated with a first updated path depends on: edges included in the first updated path; resources used by the first updated path; or edge and resource combinations included in the first updated path.

9. The network management system of any one of clauses 1 to 8, wherein: updating the set of paths comprises: generating multiple candidate updated sets of paths, each candidate updated set of paths associated with a network improvement value, and selecting among the candidate sets of paths based on the network improvement values.

10. The network management system of any one of clauses 1 to 9, wherein: updating the set of paths comprises: generating multiple candidate updated sets of paths, each candidate updated set of paths associated with a differing total change condition; and providing the multiple candidate updated sets of paths to a user and receiving in response a selected candidate set of paths; or automatically selecting among the multiple candidate updated sets of paths.

11. The network management system of any one of clauses 1 to 10, wherein: the operations further comprise: determining restoration paths for each of the paths in the updated set of paths; and configuring the communication network to address network failures using routes corresponding to the determined restoration paths.

12. A method, comprising: obtaining a representation of a communication network, the representation including: a network graph that includes vertices corresponding to nodes in the communication network and edges corresponding to communication links in the communication network; sets of resources associated with edges in the network graph; and a set of paths for the network graph, a first path of the set of paths: corresponding to a demand for the communication network; connecting a source vertex corresponding to a source node of the communication network to a terminal vertex corresponding to a terminal node of the communication network; and including a set of edge and resource combinations; updating the set of paths, the updating comprising: selecting a first path subset of the set of paths; updating the paths in the first path subset, the updating: satisfying a total change condition; satisfying a network improvement condition; and limited to unused edge and resource combinations or edge and resource combinations used by paths in the first path subset; and configuring the communication network to satisfy the demand using routes corresponding to the updated set of paths.

13. The method of clause 12, wherein: the first path subset is randomly selected; or the first path subset is selected according to a utility function that maps from edge and resource combinations to utility values.

14. The method of any one of clauses 12 to 13, wherein: the first path subset is selected according to a utility function that maps from edge and resource combinations to utility values; and the utility function comprises a Shannon entropy function of the edge and resource combinations.

15. The method of any one of clauses 12 to 14, wherein: selecting the first path subset comprises: determining a first complementary subset in the set of paths, the first complementary subset being a complement of the first path subset; applying the edge and resource combinations included in the paths of the first complementary subset to a first utility function to generate a first utility value; selecting a candidate path in the first complementary subset; determining a second complementary subset in the set of paths, the second complementary subset being a complement of the candidate path and first path subset; applying edge and resource combinations included in the paths of the second complementary subset to the first utility function to generate a second utility value; and including the candidate path in the first path subset based in part on the first utility value and the second utility value.

16. The method of clause 15, wherein: selecting the candidate path in the set of paths comprises: applying the candidate path and the first path subset to a first cost function to generate a first cost value; and including the candidate path in the first path subset based in part on the first cost value and a total cost value.

17. The method of any one of clauses 12 to 16, wherein: the paths in the first path subset are updated according to a flex grid selection method; or the paths in the first path subset are iteratively updated using a greedy method based on: a change in a utility value associated with the updated paths; or a variance in utility values associated with the updated paths.

18. The method of any one of clauses 12 to 17, wherein: satisfaction of the total change condition depends on costs associated with each updated path.

19. The method of clause 18, wherein: a first cost associated with a first updated path depends on: edges included in the first updated path; resources used by the first updated path; or edge and resource combinations included in the first updated path.

20. The method of any one of clauses 12 to 19, wherein: updating the set of paths comprises: generating multiple candidate updated sets of paths, each candidate updated set of paths associated with a network improvement value, and selecting among the candidate sets of paths based on the network improvement values.

21. The method of any one of clauses 12 to 20, wherein: updating the set of paths comprises: generating multiple candidate updated sets of paths, each candidate updated set of paths associated with a differing total change condition; and providing the multiple candidate updated sets of paths to a user and receiving in response a selected candidate set of paths; or automatically selecting among the multiple candidate updated sets of paths.

22. The method of any one of clauses 12 to 21, wherein: the method further comprises: determining restoration paths for each of the paths in the updated set of paths; and configuring the communication network to address network failures using routes corresponding to the determined restoration paths.

23. A network management system comprising: at least one processor; and a computer-readable medium containing instructions that, when executed by the at least one processor cause the network management system to perform operations comprising: obtaining a representation of a communication network, the representation including: a network graph that includes: edge $e_{12}$ that connects vertices $v_1$ and $v_2$; and edge $e_{23}$ that connects vertices $v_2$ and $v_3$; an ordered list of resources $r_{12i}$ associated with edge $e_{12}$, for i from 1 to 2n; an ordered list of resources $r_{23j}$ associated with edge $e_{23}$, for j from 1 to 2n; an ordered list of paths $p_k$ for k from 1 to 2n, the paths corresponding to demands on the communication network, wherein: for odd values of k, path $p_k$ connects $v_1$ to $v_3$ and uses resource $r_{12k}$ on edge $e_{12}$ and resource $r_{23k}$ on edge $e_{23}$; for even values of k, path $p_k$ connects $v_2$ to $v_3$ and uses resource $r_{23k}$ on edge $e_{23}$; updating the ordered list of paths, the updating comprising: selecting a first path subset of the ordered list of paths including x pairs of paths, each pair including a path $p_{2n-l+1}$ and a path $p_l$ for the first x even values of l; updating the paths in the first path subset, the updating: satisfying a total change condition that specifies a number of resource swaps x between paths in each pair of paths; reducing a Shannon entropy of the network graph; and limited to unused edge and resource combinations or edge and resource combinations used by paths in the first path subset; wherein the updated set of paths has a Shannon entropy of $$\left(\frac{H}{2n}\log 2n\right)+\frac{n-H}{2n}\log\frac{2n}{n-H},$$

where H is max(0, n−(2x+1)); and configuring the communication network to satisfy the demands using routes corresponding to the updated set of paths.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:
1. A network management system, comprising:
at least one processor; and
a computer-readable medium containing instructions that, when executed by the at least one processor, cause the network management system to perform operations comprising:
obtaining a representation of a communication network, the representation including:
a network graph that includes vertices corresponding to nodes in the communication network and edges corresponding to communication links in the communication network;
sets of resources associated with edges in the network graph; and
a set of paths for the network graph, a first path of the set of paths:
corresponding to a demand for the communication network;
connecting a source vertex corresponding to a source node of the communication network to a terminal vertex corresponding to a terminal node of the communication network; and including a set of edge and resource combinations;

updating the set of paths, the updating comprising:

selecting a first path subset of the set of paths at least in part by repeatedly adding paths in a complement of the first path subset to the first path subset based on contributions of the paths in the complement of the first path subset to a utility of the complement of the first path subset;

updating the paths in the first path subset, the updating limited to unused edge and resource combinations or edge and resource combinations used by paths in the first path subset; and configuring the communication network to satisfy the demand using routes corresponding to the updated set of paths.

2. The network management system of claim 1, wherein: the contributions of the paths in the complement of the first path subset to the utility of the complement of the first path subset are determined using a utility function that maps from edge and resource combinations to utility values.

3. The network management system of claim 2, wherein: the utility function comprises a Shannon entropy function of the edge and resource combinations.

4. The network management system of claim 1, wherein: a repeat of the repeated addition of paths comprises:

determining a first complementary subset in the set of paths, the first complementary subset being the complement of the first path subset;

applying edge and resource combinations included in the paths of the first complementary subset to a first utility function to generate a first utility value;

selecting a candidate path in the first complementary subset;

determining a second complementary subset in the set of paths, the second complementary subset being a complement of the candidate path and first path subset;

applying edge and resource combinations included in the paths of the second complementary subset to the first utility function to generate a second utility value; and including the candidate path in the first path subset based at least in part on the first utility value and the second utility value.

5. The network management system of claim 4, wherein: the repeat further comprises:

applying the candidate path and the first path subset to a first cost function to generate a first cost value; and including the candidate path in the first path subset based at least in part on the first cost value and a total cost value.

6. The network management system of claim 1, wherein: the paths in the first path subset are updated according to a flex grid selection method; or the paths in the first path subset are iteratively updated using a greedy method based on:

a change in a utility value associated with the updated paths; or a variance in utility values associated with the updated paths.

7. The network management system of claim 1, wherein: the updating of the paths in the first path subset satisfies a total change condition that depends on costs associated with each updated path.

8. The network management system of claim 7, wherein: a first cost associated with a first updated path depends on:

edges included in the first updated path;

resources used by the first updated path; or edge and resource combinations included in the first updated path.

9. The network management system of claim 1, wherein: updating the set of paths comprises:

generating multiple candidate updated sets of paths, each candidate updated set of paths associated with a network improvement value, and selecting among the candidate updated sets of paths based on the network improvement values.

10. The network management system of claim 1, wherein: the operations further comprise:

determining restoration paths for each of the paths in the updated set of paths; and configuring the communication network to address network failures using routes corresponding to the determined restoration paths.

11. A method, comprising:

obtaining a representation of a communication network, the representation including:

a network graph that includes vertices corresponding to nodes in the communication network and edges corresponding to communication links in the communication network;

sets of resources associated with edges in the network graph; and a set of paths for the network graph, a first path of the set of paths:

corresponding to a demand for the communication network;

connecting a source vertex corresponding to a source node of the communication network to a terminal vertex corresponding to a terminal node of the communication network; and including a set of edge and resource combinations;

updating the set of paths, the updating comprising:

selecting a first path subset of the set of paths at least in part by repeatedly adding paths in a complement of the first path subset to the first path subset based on contributions of the paths in the complement of the first path subset to a utility of the complement of the first path subset;

updating the paths in the first path subset, the updating limited to unused edge and resource combinations or edge and resource combinations used by paths in the first path subset; and configuring the communication network to satisfy the demand using routes corresponding to the updated set of paths.

12. The method of claim 11, wherein: the contributions of the paths in the complement of the first path subset to the utility of the complement of the first path subset are determined using a utility function that maps from edge and resource combinations to utility values.

13. The method of claim 12, wherein: the utility function comprises a Shannon entropy function of the edge and resource combinations.

14. The method of claim 11, wherein: a repeat of the repeated addition of paths comprises:

determining a first complementary subset in the set of paths, the first complementary subset being the complement of the first path subset;

applying edge and resource combinations included in the paths of the first complementary subset to a first utility function to generate a first utility value;

selecting a candidate path in the first complementary subset;

determining a second complementary subset in the set of paths, the second complementary subset being a complement of the candidate path and first path subset;

applying edge and resource combinations included in the paths of the second complementary subset to the first utility function to generate a second utility value; and including the candidate path in the first path subset based at least in part on the first utility value and the second utility value.

15. The method of claim 14, wherein:

the repeat further comprises:

applying the candidate path and the first path subset to a first cost function to generate a first cost value; and including the candidate path in the first path subset based at least in part on the first cost value and a total cost value.

16. The method of claim 11, wherein:

the paths in the first path subset are updated according to a flex grid selection method; or the paths in the first path subset are iteratively updated using a greedy method based on:

a change in a utility value associated with the updated paths; or a variance in utility values associated with the updated paths.

17. The method of claim 11, wherein:

the updating of the paths in the first path subset satisfies a total change condition that depends on costs associated with each updated path.

18. The method of claim 17, wherein:

a first cost associated with a first updated path depends on:

edges included in the first updated path;

resources used by the first updated path; or edge and resource combinations included in the first updated path.

19. The method of claim 11, wherein:

updating the set of paths comprises:

generating multiple candidate updated sets of paths, each candidate updated set of paths associated with a differing total change condition; and providing the multiple candidate updated sets of paths to a user and receiving in response a selected candidate set of paths; or automatically selecting among the multiple candidate updated sets of paths.

20. The method of claim 11, wherein:

the method further comprises:

determining restoration paths for each of the paths in the updated set of paths; and configuring the communication network to address network failures using routes corresponding to the determined restoration paths.

* * * * *